May 8, 1928. 1,668,928
J. WARDLE
TELEMOTOR OPERATED LIQUID DISCHARGE AND ADMISSION VALVE
Filed Dec. 28 1927

Inventor
John Wardle
By
Pennie, Davis, Marvin and
Attorneys

Patented May 8, 1928.

1,668,928

UNITED STATES PATENT OFFICE.

JOHN WARDLE, OF VICKERSTOWN, BARROW-IN-FURNESS, ENGLAND, ASSIGNOR TO VICKERS LIMITED, OF WESTMINSTER, ENGLAND, A BRITISH COMPANY.

TELEMOTOR-OPERATED LIQUID DISCHARGE AND ADMISSION VALVE.

Application filed December 28, 1927, Serial No. 243,110, and in Great Britain March 8, 1927.

This invention relates to telemotor operated valves of the type known as Kingston valves for controlling the admission of water to or its expulsion from tanks and other vessels, especially those used on submarines and ships where water has on occasion to be expelled by blowing in air against the pressure of the external water, which may be considerable if the tank is submerged to a substantial depth. Such valves are generally controlled from a distance by fluid operated servo-motors which cause the valve to be moved into the open or closed position according to conditions.

Difficulties arise, especially in submarines, owing to the fact that if the blowing air is supplied to the tank before the valve is opened the air pressure in the tank may become excessive, and, on the other hand, if the valve is opened before the air pressure is equal to the external pressure water will enter the tank instead of being expelled, with the result that if, for example, a submarine is rapidly descending out of control, the entrance of the water may give rise to a very dangerous condition. The chief object of the present invention is to provide a valve which will avoid such accidental action.

According to this invention the valve is not as usual connected directly to the operating member (usually a piston) by which it is opened against the pressure of the water, but is coupled to this member by an intermediate device which allows of a limited relative movement between the valve and operating member so that when the valve is to be opened for discharge it is not actually lifted from its seat until the internal air pressure exceeds the external pressure. The intermediate device therefore allows of lost motion between the valve and its operating member.

In order that the said invention may be clearly understood and readily carried into effect, the same will be more fully described with reference to the accompanying drawings, in which:—

Figure 1:
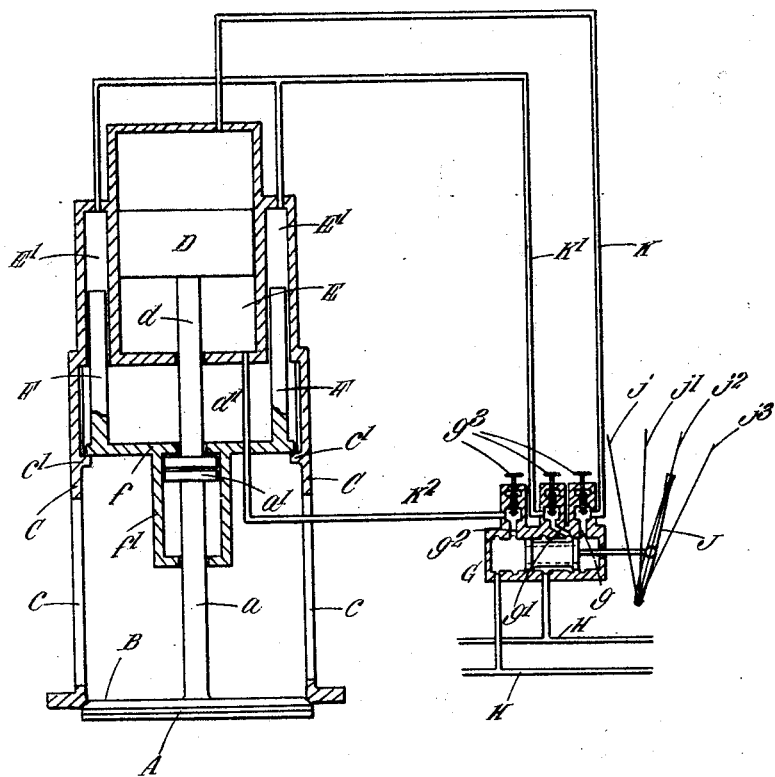
Figure 2:
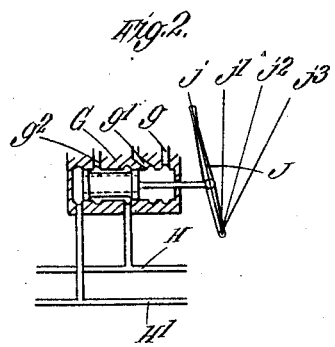
Figure 3:
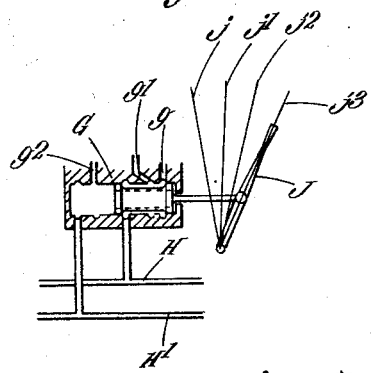

Figure 1 is a diagrammatic illustration of a telemotor valve system embodying this invention; and Figures 2 and 3 are diagrammatic representations of the controlling telemotor valve indicated in Figure 1, showing it in two other positions of control.

A is the Kingston valve closing the valve opening B in the skin of the vessel and exposed to the sea on its outer face. C is a cylindrical support or bracket extending inwardly of the vessel or the tank and having large openings $c$ which allow of free access of the water or air in the tank to the back of the valve A. D is the valve operating piston, the rod $d$ of which meets the valve rod $a$. The piston slides in the cylinder E. F, F are rams slidable in the small cylinders $E^1$ on the sides of the cylinder E and connected together by the cross member $f$. G is the distant controlling telemotor valve through which the Kingston valve is operated.

The valve G shown is of hollow piston type, connected to the pressure main H and return main $H^1$ and operated by the handle J. The different positions of the handle indicated are respectively, $j$ "shut," $j^1$ "neutral," $j^2$ "blow" and $j^3$ "flood", the valve piston controlling the ports $g$, $g^1$, $g^2$ connected to the pipes K, $K^1$, $K^2$ according to the operations to be effected. The pipe K leads to the upper end of the cylinder E, the pipe $K^1$ to the two ram cylinders $E^1$ and the pipe $K^2$ to the lower end of the cylinder E. Stop valves $g^3$ may be provided to shut off communication between the telemotor valve G and the Kingston valve mechanism when desired.

In the construction shown the valve stem $a$ and the operating piston rod $d$ are provided with end flanges or heads $a^1$, $d^1$ which abut against one another when the valve is to be opened by the piston D. The heads or flanges of both valve stem and rod are free to slide in a cylinder or guide $f^1$ belonging to the rams F having a limited stroke (determined by stop $c^1$ on member C) and so arranged that at the end of the outward travel of the rams (as shown in Figure 1) the adjacent ends or heads $a^1$, $d^1$ of the valve stem $a$ and the piston rod $d$ can separate, with the valve A free to open against the external pressure up to the limit of relative movement provided for, but enabling the valve to remain closed (as shown) under the action of the external water pressure until the blowing pressure inside the tank, acting upon the reduced area of the inner side of the valve, overcomes the external pressure and allows the water to be discharged. The valve A can also be operated against the external pressure if necessary in order to admit water to the tank by admitting the controlling fluid pressure to the upper side of the piston D (position $j^3$ of handle J, as in Figure 3) so as to bring the heads $a^1$, $d^1$ of the valve stem $a$ and piston rod $d$ into contact and positively act upon the valve to move it from its seat.

In the position shown in Figure 1 the control handle J is in the "blow" position $j^2$, in which the port $g^1$ and pipe $K^1$ are connected to the pressure main H. The rams F are moved down carrying with them the piston D by means of the cross member $f$, the spaces above and below the piston D being in communication by the pipes K, $K^2$ and ports $g$, $g^2$ with the return main $H^1$ and the valve A is free to open if the internal pressure is sufficient. This position corresponds to the blowing position in which when the pressure in the tank is raised sufficiently any water contained in it will be blown out through the valve on opening, but water is prevented from entering.

In the position of the valve G indicated in Figure 2 the port $g^2$ is open to the pressure main H and the Kingston valve A is positively closed by pressure fluid admitted through the pipe $K^2$ to the lower end of the cylinder E, while the pipes K and $K^1$ and ports $g$ and $g^1$ are connected through the centre of the hollow valve G to the return main $H^1$. The upward movement of the piston D to the top of the cylinder E lifts the rams F by the pressure against the connecting member $f$ of the piston rod head $d^1$ while at the same time the cylindrical guide $f^1$ depending from the member $f$ acts on the valve rod head $a^1$ and pulls up the valve A positively into closed position.

In Figure 3 the valve G has been operated so as to open the port $g$ connecting the pipe K to the pressure main H, the adjacent port $g^1$ leading to the pipe $K^1$ being also open to pressure, so that the pressure fluid is admitted to the top both of the cylinder E and the two ram cylinders $E^1$, the rams being then in the lower position indicated in Figure 1. The pressure fluid acting on top of the piston D then driving the piston into the lower end of the cylinder E opens the valve A positively against the pressure of the external water for flooding the tank. The space below the piston D is open through the pipe $K^2$ and the port $g^2$ to the return main $H^1$. In the neutral position all the pipes K, $K^1$, and $K^2$ are cut off from the pressure main.

While in the arrangement illustrated the control valve is shown as a hollow or tubular piston valve the valve may be of any other convenient type, such as a flat slide valve with the ports in the valve plate and the passages in the valve arranged to connect the pressure main H and the return main $H^1$ to the pipes K, $K^1$, $K^2$ as required. Ordinary spring controlled valves with lever operation could also be employed for the same purpose.

What I claim and desire to secure by Letters Patent of the United States is:—

1. In a telemotor operated valve system of the kind set forth, a valve adapted to control the admission of water to a vessel and its discharge therefrom against pressure, a distant valve controller, a valve operating member adapted to be actuated from the distant controller and an intermediate device between the said operating member and the valve whereby lost motion is provided so that when the valve is to be opened for discharge of the water it is not actually lifted from its seat until the internal pressure exceeds the external water pressure on the said valve.

2. In a telemotor operated valve system of the kind set forth, a valve adapted to control the admission of water to a vessel and its discharge therefrom against pressure, a distant controller, a valve operating member adapted to be actuated from the distant controller, a telemotor controlled member, and means for engaging the said member alternatively with the valve and with the aforesaid valve operating member with lost motion between the engaging parts.

3. In a telemotor operated valve system of the kind set forth, a valve controlling the admission of water to a vessel and its discharge therefrom against pressure, a valve stem, a valve operating piston with piston rod, adapted to abut against the valve stem, means for admitting pressure fluid to the back of the said piston under telemotor control, and an intermediate device between the said piston rod and valve stem and engaging therewith with lost motion between the parts.

4. In a telemotor operated valve system as in claim 1, a fluid pressure operated ram connected to the said intermediate device and means by which the fluid pressure acting upon the ram is controlled from the distant controller.

5. In a telemotor operated valve system as in claim 2, a fluid pressure operated ram connected to the said intermediate device and means by which the fluid pressure acting upon the ram is controlled from the distant controller.

6. In a telemotor operated valve system of the kind set forth, a valve adapted to control the admission of water to a vessel and its discharge therefrom against pressure, a distant valve controller, a valve operating double acting piston, a cylinder in which the said piston works, means for supplying pressure fluid to either end of the said cylinder under the operation of the distant controller and an intermediate device between the said operating piston and the valve whereby lost motion is provided so that when the valve is to be opened for discharge of the water it is not actually lifted from its seat until the internal pressure exceeds the external water pressure on the said valve.

7. In a telemotor operated valve system of the kind set forth, a valve adapted to control the admission of water to a vessel and its discharge therefrom against pressure, a distant controller comprising a control valve of piston type, fluid pressure and return mains from the said controller, a valve operating member adapted to be actuated from the distant controller, a telemotor controlled member, and means for engaging the said member alternatively with the valve and with the aforesaid valve operating member with lost motion between the engaging parts.

8. In a telemotor operated valve system of the kind set forth applied to a submarine or other vessel, a Kingston valve, an opening in the skin of said vessel to which the valve is fitted, means for supporting the valve from the interior of the vessel, a double acting valve operating piston, a cylinder in which the said piston works, fluid pressure operated rams associated with the said Kingston valve, a distant controller of valve type, fluid pressure and return mains connected to the said controller, connections from the controller valve to the upper and lower ends of the aforesaid cylinder, further connections to the fluid pressure ram, an intermediate device between the piston and the Kingston valve, adapted to engage with both piston and valve with lost motion between the members whereby the said Kingston valve is free to open against the external pressure up to the limit of movement provided for, but enabling the valve to remain closed under the action of the external pressure until the internal pressure exceeds the external pressure on the valve.

JOHN WARDLE.